US012438296B1

(12) United States Patent
Lilja

(10) Patent No.: US 12,438,296 B1
(45) Date of Patent: Oct. 7, 2025

(54) LAYERED CONNECTOR

(71) Applicant: StealthCase Oy, Tampere (FI)

(72) Inventor: Juha Lilja, Tampere (FI)

(73) Assignee: StealthCase Oy, Tampere (FI)

( * ) Notice: Subject to any disclaimer, the term of this patent is extended or adjusted under 35 U.S.C. 154(b) by 0 days.

(21) Appl. No.: 19/098,060

(22) Filed: Apr. 2, 2025

(30) Foreign Application Priority Data

Apr. 8, 2024 (EP) .................................... 24169029

(51) Int. Cl.
*H01R 12/79* (2011.01)
*H01Q 1/27* (2006.01)
*H01R 12/71* (2011.01)
*H01R 13/631* (2006.01)
*H01R 13/646* (2011.01)

(52) U.S. Cl.
CPC ............. *H01R 12/79* (2013.01); *H01Q 1/273* (2013.01); *H01R 12/714* (2013.01); *H01R 13/631* (2013.01); *H01R 13/646* (2013.01)

(58) Field of Classification Search
CPC .... H01R 12/79; H01R 12/714; H01R 13/631; H01R 13/646; H01Q 1/273
See application file for complete search history.

(56) References Cited

U.S. PATENT DOCUMENTS 10,715,216 B2 * 7/2020 Pagani .................... H01L 23/66
2008/0119135 A1 5/2008 Washiro
2010/0164671 A1 7/2010 Pagani et al.
2019/0181918 A1 * 6/2019 Pagani ................... H05K 1/165
2022/0209410 A1 * 6/2022 Lilja ................... C03C 17/3681

OTHER PUBLICATIONS

European Patent Office, Extended European Search Report, Application No. 24169029.6, mailed Oct. 10, 2024, 10 pages.
European Patent Application No. 24169029.6, Application as Filed, Filed Apr. 8, 2024, 46 pages.

* cited by examiner

*Primary Examiner* — Abdullah A Riyami
*Assistant Examiner* — Nader J Alhawamdeh
(74) *Attorney, Agent, or Firm* — ZIEGLER IP LAW GROUP, LLC.

(57) ABSTRACT

A device for connecting RF signal between a first and a second microwave element, the device including coupling interfaces, wherein the device is arranged to facilitate said connection with less than 2 dB coupling loss between said interfaces at a first frequency. The device is a connector arrangement that includes a first and a second layered member structured to be mated with a fixturing member of the device, and said members being isolated by a coupling membrane, wherein the first layered member includes a first mating aperture, arranged to receive the RF signal from the first microwave element via first of the coupling interfaces, and the second layered member includes a second mating aperture, arranged to connect the received RF signal to the second microwave element via second of the coupling interfaces.

8 Claims, 7 Drawing Sheets

LAYERED CONNECTOR

FIELD OF THE INVENTION

The present invention relates to a device for connecting RF signal between a first and a second microwave element, the device comprising coupling interfaces, wherein the device is arranged to facilitate said connection with less than 2 dB coupling loss between said interfaces at a first frequency. The invention also relates to a method for connecting RF signal between a first and a second microwave element, using the device.

BACKGROUND OF THE INVENTION

The realm of wireless communication has witnessed substantial advancements in the integration of flexible and textile-based antennas, primarily due to their potential for innovation in wearable technology and smart clothing. Despite the considerable interest and ongoing research in conformal antennas over the past decade, a significant challenge has remained unaddressed in the seamless integration of these flexible antennas with the necessary electronic components, particularly in the context of industrial scalability and durability in real-world applications.

Traditionally, the connection between flexible antennas and the required electronics has been established using Subminiature version A (SMA) connectors soldered directly onto conductive fabrics or flexible membranes. This method, however, presents critical vulnerabilities at the interface where the flexible and rigid components meet, notably a lack of resilience to mechanical stress such as bending. More fragile approaches, including the use of conductive paste, have proven inadequate due to cracking after minimal flexion.

Alternative methods, such as embedding a coaxial cable into the fabric through sewing or embroidery, have not only required labor-intensive processes incompatible with mass production but have also failed to eliminate mechanical stress at the connection points, thereby compromising the durability and performance of the antenna system. Additionally, these methods introduce unwanted bulkiness and stiffness, detracting from the wearability and comfort of the antenna-integrated garments, and the antennas may not be detached from the radios after attachment.

BRIEF SUMMARY OF THE INVENTION

Recognizing these challenges, the present invention improves the level of the state-of-the-art in the interface between flexible antennas and their electronic counterparts. The invention introduces a novel approach to creating a reliable, low-loss, and solderless connection that withstands real-life usage demands without sacrificing the antenna's performance or the garment's flexibility and comfort. Moreover, the connector according to the present invention may be conveniently detached from the antenna using a snap-fit mechanism used to interlock the counter parts of the connector.

The present invention introduces an advantageous solution in the form of a flexible RF connector designed specifically for quick attachment and detachment of rigid printed circuit boards (PCBs) to flexible membranes, such as textile antennas. This invention eliminates the need for direct galvanic contact between conductors, thereby enhancing the connector's durability and performance in harsh environmental conditions, including exposure to moisture and the risk of oxidation. More specifically, the communication may be arranged through a non-conductive membrane that serves as a waterproof insulating layer, and removes the communication vulnerability to conductor oxidation. The design incorporates a snap-fit RF/microwave connector that facilitates a seamless RF communication interface between the flexible membrane antenna and the electronic component, ensuring a connection loss of less than 1 dB at a first microwave frequency, and advantageously over multi-gigahertz bandwidth around the first frequency.

One of the most compelling features of this invention is its adaptability for use in smart clothing and other applications requiring flexible membrane antennas. The connector's design not only supports the quick release of electronic components for practical considerations, such as garment washing, but also promotes the integration of wearable technology into daily life without compromising on the aesthetic and functional demands of modern consumers.

Without limiting the potential scope of the present invention, the present invention may be utilized in fabrics, membranes, films, clothing, wearable or body-worn systems, kites, sails, and as laminates in drones, unmanned aerial vehicles, airships, boats, yachts and other marine platforms such as life rafts or life vests.

It is an aim of the present invention to improve the state of the art and to provide a device for a wireless device with enhanced properties for connecting electromagnetic signals between a radio unit and a microwave element such as an antenna.

An aim is to provide a broadband cable-less connection between connected microwave elements without a need for galvanic contacts between the electrically conductive elements of the separated microwave elements.

An aim is to provide a solution that can be applied to broadband cable-less connections between connected microwave elements without a need for galvanic contacts between the electrically conductive elements of the separated microwave elements. In one aspect of the present invention, the connector may filter out a DC component from the signal to be connected.

The invention relates to the field of wireless communication technology, specifically focusing on the development of flexible radio frequency (RF) connectors for integrating rigid electronic components with flexible, conductive materials. The invention is especially relevant to wearable technology, smart clothing, and other applications requiring durable, efficient, and flexible connections between textile-based antennas and electronic devices for enhanced wireless communication capabilities. The invention is not limited to the described examples.

The invention addresses a gap in the integration of flexible and textile-based antennas with electronic devices, a challenge that has persisted due to the fragility of conventional connection methods in the face of mechanical stress and environmental conditions. Existing techniques, such as soldering SMA connectors to conductive fabrics or using conductive paste, have proven inadequate due to their inability to withstand real-world use, particularly bending and environmental exposure. This invention introduces a robust, flexible RF connector designed for seamless and durable integration of flexible antennas into radio units, overcoming the limitations of previous methods while enhancing functionality and antenna performance.

The invention may provide advantageous ways to connect radio units on printed circuit boards (PCBs) with flexible microwave elements without the need for bulky coaxial cables. One practical example is the integration of flexible and textile antennas with so called smart fabrics, such as jackets or backpacks in a seamless way that remain unobtrusive to the user. Other examples are provided in the technical specification.

The present invention presents advantageous methods to integrate radio units with fabrics such that the radio units may be attached or detached using snap-fit interlocks, buckles, buttons, rivets, Velcro, or other typical fasteners, wherein a structural member of the device enclosure may be structured as a fixturing member that mates the communication interfaces of the microwave elements. The connected RF signal may be coupled through a waterproof membrane such that the fabric antenna may be washed with the smart fabric. In another example, the present invention may be used to connect waterproof textile antennas in large integration platforms such as life raft roofs with attachable radio units that are interlocked with the structural member upon use of the wireless connection.

Unlike the traditional methods for integrating flexible antennas with rigid circuit boards or cables using soldering or cured conductive paste that form brittle mechanical interfaces, the present invention comprises mating apertures and a fixturing member that mates the planar apertures without a need for cables or galvanic contacts between the connected microwave elements.

The device according to the present invention is a connector arrangement.

In an alternative embodiment, there is provided a fixturing member according to the present invention.

The present invention relates to a device for connecting RF signal between a first and a second microwave element, the device comprising coupling interfaces, wherein the device is arranged to facilitate said connection with less than 2 dB coupling loss between said interfaces at a first frequency.

To put it more precisely, the device according to the present invention is primarily characterized in that the device is a connector arrangement that comprises a first and a second layered member structured to be mated with a fixturing member of the device, and said members being isolated by a coupling membrane, wherein the first layered member comprises a first mating aperture, arranged to receive the RF signal from the first microwave element via first of the coupling interfaces, and the second layered member comprises a second mating aperture, arranged to connect the received RF signal to the second microwave element via second of the coupling interfaces.

The fixturing member may be structured for mating the mating apertures to exchange the RF signal through said membrane to facilitate said connection as a result of projecting one of said apertures on the other by fixturing a surface of both layered members on the other.

The present invention shows electrical and mechanical advantages over the solutions of prior art. Some advantageous embodiments of the invention are presented in the dependent claims.

It is to be understood that the connectable microwave elements may be, or may comprise flexible layers, membranes, films, or the like, and it is implicitly clear that the elements, such as layered members, may comprise stacks or laminates of films, membranes, or layers.

Some example methods are also disclosed in the specification.

DESCRIPTION OF THE DRAWINGS

In the following, the present invention will be described in more detail with reference to the appended drawings, in which.

DETAILED DESCRIPTION OF THE INVENTION

Figure 1:
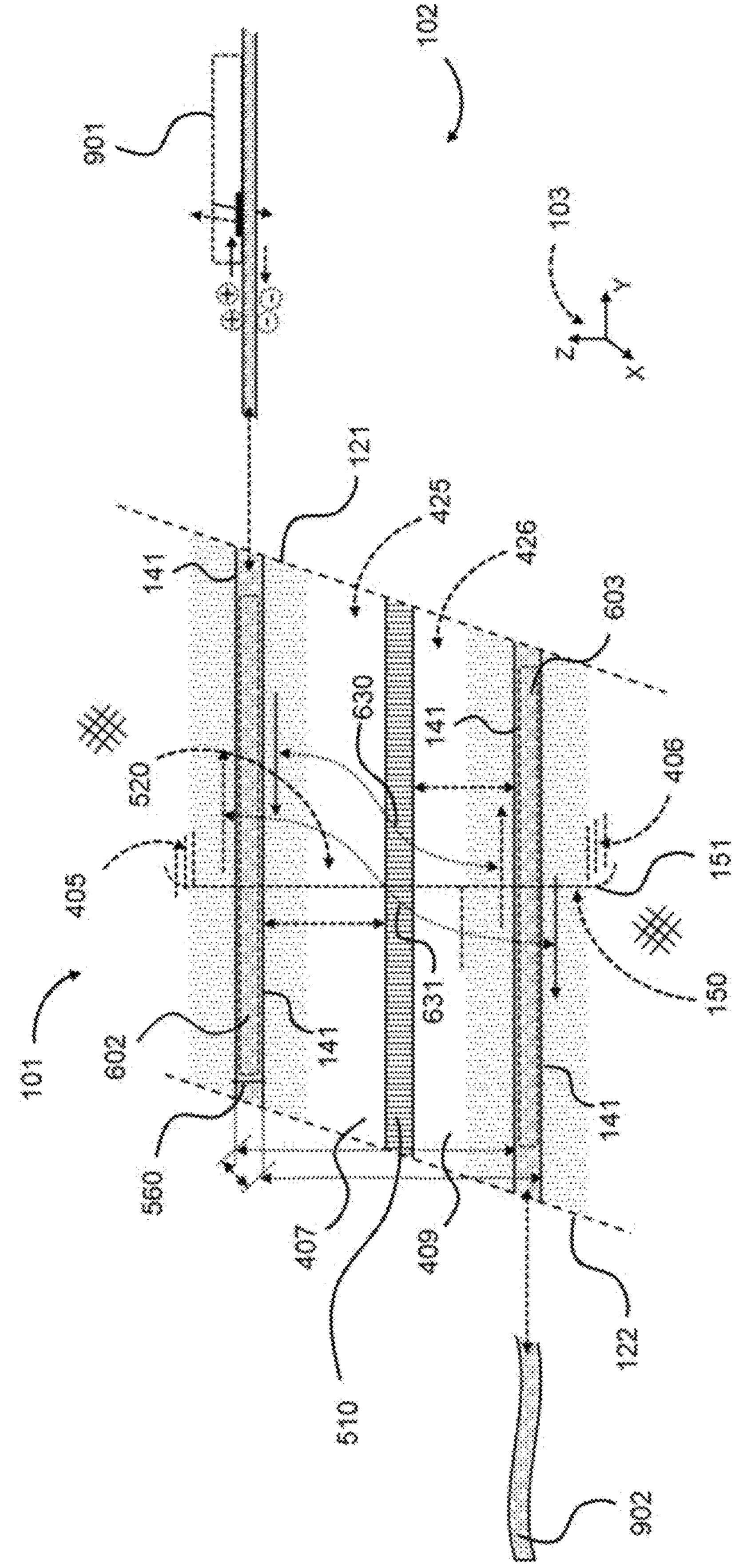
FIG. 1 shows an abstraction of a device with a first and a second microwave element according to the present invention, in accordance with an embodiment.

The detailed description of the present invention presents various characteristics of the present invention. The examples at the end of the specification describe the embodiments to reach the technical advantages of the provided characteristics.

In the context of this patent specification, the term "RF signal" is used to denote an electrical signal that may be a sinusoid wave of a first frequency, and it may carry frequency components at the sides of the carrier signal as a result of modulation of information content.

The first frequency may be configured for frequencies from 1 MHz to 100 GHz. It is to be understood that the first frequency of the RF signal, and thus the frequency spectrum carried by the RF signal is not limited by the letters RF.

The microwave elements 901 and 902 are to be understood as elements of electronic systems or components, capable of carrying microwave signals. The choice of words RF, and microwave are used in this specification to distinguish embodiments, or characteristics between embodiments, and not intended to define limitations on the frequency coverage of the embodiments themselves.

In an aim to solve the objective technical problem behind the present invention, a skilled approach according to the prior art might involve approaches to design coupled RF lines, such as two microstrip line ends facing each other for forming stripline kind of combined structures. However, the approach lacks the technical performance level required for replacing the traditional SMA-type connectors that rely on direct galvanic contact. In the above example, the coupling level in an optimized solution remains typically around-3 . . . 6 dB, which is not sufficient for an industrial RF connector. A direct galvanic contact between the signal traces and a direct galvanic contact between the ground planes would be required for low coupling loss and broadband operation, and thus the targeted improvements reached with the present invention would be lost. The primary physical fallback in the above example solution relies in the fact that the fields remain trapped within the non-connected areas between the separated signal-ground pairs, and the fields are not transferred according to the present invention.

Considering two conductor edges of two conductor areas that may be connected together or galvanically separated from each other, upon receiving a RF signal, i.e. electromagnetic energy in a form of conduction current, the two separated edges carry this signal partly in the movement of electrons along said edges, and partly in the electromagnetic fields connecting said conduction currents. These currents form a first current pair, denoted as a driving current pair 661. The driving current pair 661 flows at the opposing sides of a first mating aperture 602, and the electric field vectors within the first mating aperture connect the two conductor edges along a shortest path between said edges in partially continuous line segments along said edges.

In an embodiment according to the present invention, there is provided a device 101 for connecting RF signal between a first 901 and a second 902 microwave element, the device 101 comprising a first 121 and a second 122 coupling interface, wherein the device 101 is arranged to facilitate said connection with less than 2 dB coupling loss between said interfaces 121, 122 at a first frequency.

FIG. 1 presents an abstraction of a device with a first and a second microwave element according to the present invention, in accordance with an embodiment.

In the present solution according to the invention, the first characteristic of a broadband RF connector is provided wherein the device may be used as a cable-less rigid-to-flex transition between two connected microwave elements, wherein, according to an embodiment, the connection may be established between a radio unit and an antenna, wherein the antenna is a flexible antenna.

In a second characteristic, the device according to the present invention, may be configured as a conformal RF transition between connected microwave elements that allows repeated bending without breakage from the interface between the rigid and flexible embodiments. The signal connections may be implemented as planar surfaces, thus eliminating the need for SMA-type connectors where a galvanic contact of two conductors is required for broadband operation. In an embodiment, the mating apertures may be formed with flexible membranes or textile layers.

In an embodiment, the device is a connector arrangement 101 that comprises a first 405 and a second 406 layered member structured to be mated with a fixturing member 150 of the device 101, and said layered members 405, 406 being isolated by a coupling membrane 510, wherein the first layered member 405 comprises a first mating aperture 602, arranged to receive the RF signal from the first microwave element 901 via a first coupling interface 121, and the second layered member 406 comprises a second mating aperture 603, arranged to connect the received RF signal to the second microwave element 902 via a second coupling interface 122. Said fixturing member 150 may be structured for mating the mating apertures 602, 603 to exchange the RF signal through said membrane 510 to facilitate said connection as a result of projecting one of said apertures on the other by fixturing a surface of both layered members 405, 406 on the other.

In an embodiment the device 101 is a connector arrangement that is adapted for connecting an RF signal.

The advantageous functionality reached with the presented projection of at least one of said apertures 602, 603 on the other is that a magnetic flux 680 initiated by the first mating interface 602 is effectively configured to be received by the second mating interface 603 such that this coupling is arranged to generate the induced current pair 660 at the receiving side as a result of driving the first aperture 602 with the driving current pair.

In an advantageous embodiment, the fixturing member 150 may be configured to facilitate the mating of the apertures 602, 603 according to the present invention.

In an advantageous embodiment, a first displacement current path 630 may be formed between the two conductor areas bordered by first edges of the at least two conductor edges bordering each of the mating apertures 602, 603, wherein said first edges are galvanically separated from each other.

In an advantageous embodiment, a second displacement current path 631 may be formed between the two conductor areas bordered by second edges of the at least two conductor edges bordering each of the mating apertures 602, 603, wherein said second edges are galvanically separated from each other.

In an embodiment, the first layered member 405 may comprise at least two conductor edges that border the first mating aperture 602 with conductor areas, wherein the at least two conductor edges of the first layered member 405 are arranged to receive the RF signal from the first microwave element 901 at a first frequency under mating, and the second layered member 406 comprises at least two conductor edges that border the second mating aperture 603 with conductor areas, wherein, the structuring of the conductor areas bordering said mating apertures 602, 603 is configured such that upon receiving said RF signal, the induced electric field strength between one of the two mated conductor area pairs bordering the opposite mating apertures 602, 603 exceeds the electric field strength of the weaker of the electric field strengths within the two mating apertures 602, 603 at the first frequency.

In an embodiment, the first layered member 405 may comprise at least two conductor edges that border the first mating aperture 602 with conductor areas, wherein the at least two conductor edges of the first layered member 405 are arranged to receive the RF signal from the first microwave element 901 at a first frequency under mating, and the second layered member 406 comprises at least two conductor edges that border the second mating aperture 603 with conductor areas, wherein, the structuring of the conductor areas bordering said mating apertures 602, 603 is configured such that the interlaced or overlapped surface area between one of the two mated conductor area pairs bordering the opposite mating apertures 602, 603 exceeds the interlaced or overlapped surface area shared by the mated mating apertures 602, 603.

In an embodiment, the structuring of the conductor areas bordering the mating apertures 602, 603 may be arranged to connect a first 630 and a second 631 displacement current path through said membrane 510 to facilitate the coupling with less than 1 dB coupling loss through said membrane 510 upon reception of the RF signal by the first mating aperture 602 by coupling a first and a second conduction current from the edges of said first mating aperture 602 to the edges of said second mating aperture 603 with both conduction currents changing direction.

The above-described arrangement is advantageous in an aim to implement a device 101 according to the present invention with a coupling loss of less than 1 dB at a first frequency and a multi-gigahertz bandwidth of less than 2 dB coupling loss around the first frequency.

In a non-binding example, there may be a device 101 with interlaced or overlapped conductor surfaces encircling the first 602 and the second 603 mating aperture.

In a third characteristic of the present invention, there is provided a broadband and low-loss rf connection that is not dependent on galvanic contacts between the elements. The structuring of the mating apertures may be advantageously configured to connect the microwave elements without the need of specific compression force that is needed in conventional PCB contact springs, and that often loose over time. As a non-binding example, the mated planar mating apertures may be advantageously fixtured using a fixturing member, sewing, embroidery, snap-fit mechanism, rivets, buckles, or flexible adhesive layers.

In a fourth characteristic of the invention, there is provided a durable, reliable, and long-lasting connection that is not prone to loosening of contact pressuring, or environmental effects such as oxidation. According to an embodiment, the device may comprise a coupling membrane to shield signal carrying conductors against environmental effects, wherein the electromagnetic coupling through the membrane may provide independency from loosening galvanic contacts due to the advantageous structuring of the mating apertures.

In a fifth characteristic, the device according to the present invention may be arranged to provide a broadband RF connection through the isolating membrane, wherein obvious couplers typically provide only a narrow-band resonance-based coupling between a first and a second resonant element.

In an embodiment of the present invention, there is provided an advantageous arrangement of the structural characteristics of the conductors forming the mating apertures of planar layers or membranes such that a broadband operation may be reached. As a non-binding example, the present invention has been shown to provide a coupling loss of less than 0.5 dB for over 3 GHz bandwidth at S-band frequency range, and less than 1 dB coupling for over 4 GHz bandwidth with a configuration dimensioning of 8×20 $mm^2$.

In an embodiment, said fixturing member 150 may be structured for mating the mating apertures 602, 603 to exchange the RF signal through said membrane 510 to facilitate said connection as a result of projecting one of said apertures on the other by fixturing a surface of both layered members 405, 406 on the other.

Figure 2:
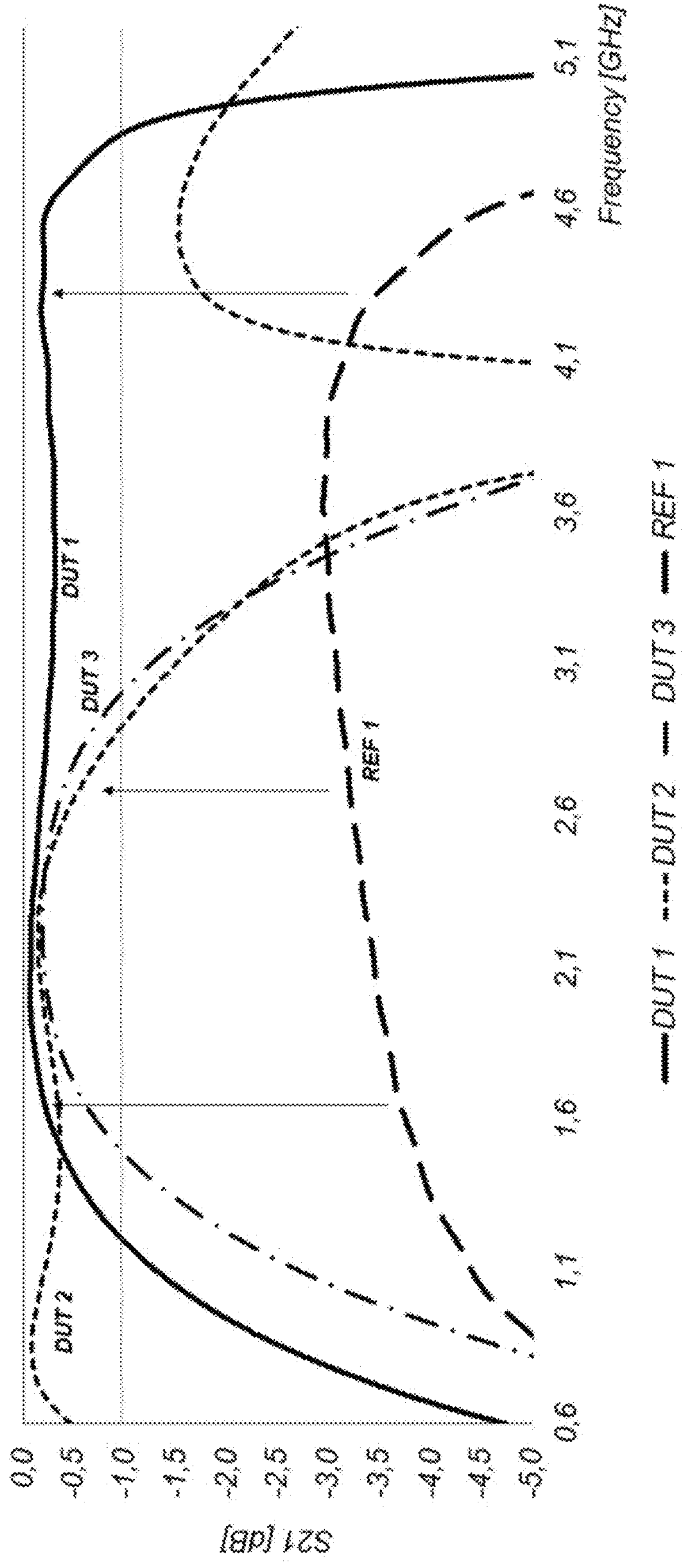
FIG. 2 shows a simulation of the coupling efficiency of a device according to the present invention.

FIG. 2 presents simulated performance of an optimized device 101 according to the present invention. Various alternatives are illustrated that may be configured to be mated by alternative forms of the fixturing member.

There is provided an example of the RF connectivity between the two interfaces 121 and 122. In the simulated configuration, the interfaces are connected at opposite sides of an isolating coupling membrane 510. The thickness of the membrane in the example is 0.3 mm.

The first structure, according to an embodiment, and referred to as "DUT 1" comprises identical structuring of the conductor areas, and the conductor edges of said areas on the surfaces of the layered members. The first layered member 405 comprises two conductor edges interfaced with a first surface 407 defined by a first layered member 405, wherein said edges border the first mating aperture 602 with a separation of 0.59 mm. The second layered member 406 comprises a second dielectric layer 426 and at least two conductor edges interfaced with a third 409 surface defined by said second layered member 406, wherein said edges border the second mating aperture 603 with a separation of 0.59 mm. The apertures 602 and 603 have lengths of 20 mm.

According to an embodiment, at least one of the mating apertures 602, 603 may border a conductor area with one edge of the aperture. In the presented example, both apertures border a conductor area, and in said example, the conductor area has a width of 2.5 mm.

According to an embodiment, at least one conductor area comprising a conductor edge 141 that borders the first 602 or the second 603 mating aperture, may be configured to encircle the bordered aperture and the conductor area bordered by said at least one mating aperture. In the presented example, a conductor area with a length of 2.5 mm is arranged to encircle the first mating aperture 602 from its inner edge, and a conductor area with a length of 2.5 mm is arranged to encircle the second mating aperture 603 from its inner edge.

There is also provided an example, named as REF 1. The structure of said example is similar to the structure of DUT 1, except a metal plane is inserted at the opposite side of the first layered member 405 at a distance of 1 mm. The effect of the metal plane is that the coupling efficiency is considerably reduced. This is because, upon receiving the RF signal by the first mating aperture 602, the electric fields induced by said signal remain partially trapped between the metal areas bordered by said first mating aperture 602 and the added metal plane. This might be a favorable condition if the RF signal would be intended to be conducted along the surface of the first layered member. However, in an aim to force the signal energy to couple through the coupling membrane 510 that locates at the opposite side of the metal plane, the trapping of the electric fields is harmful.

The simulated examples also present a structure referred to as DUT 2. In this advantageous arrangement, the first mating aperture 602 is configured to encircle a circular conductor area with the inner edge of said aperture 602. The second mating aperture 603 is likewise formed to encircle a circular conductor are with the inner edge of said aperture 603. The diameter of the inner area is 16 mm in the simulated example, which is adequate to be used as a compression point to be compressed by an inner surface 151 of the fixturing member 150. In another example, said compression may be provided with a magnet.

Figure 3:
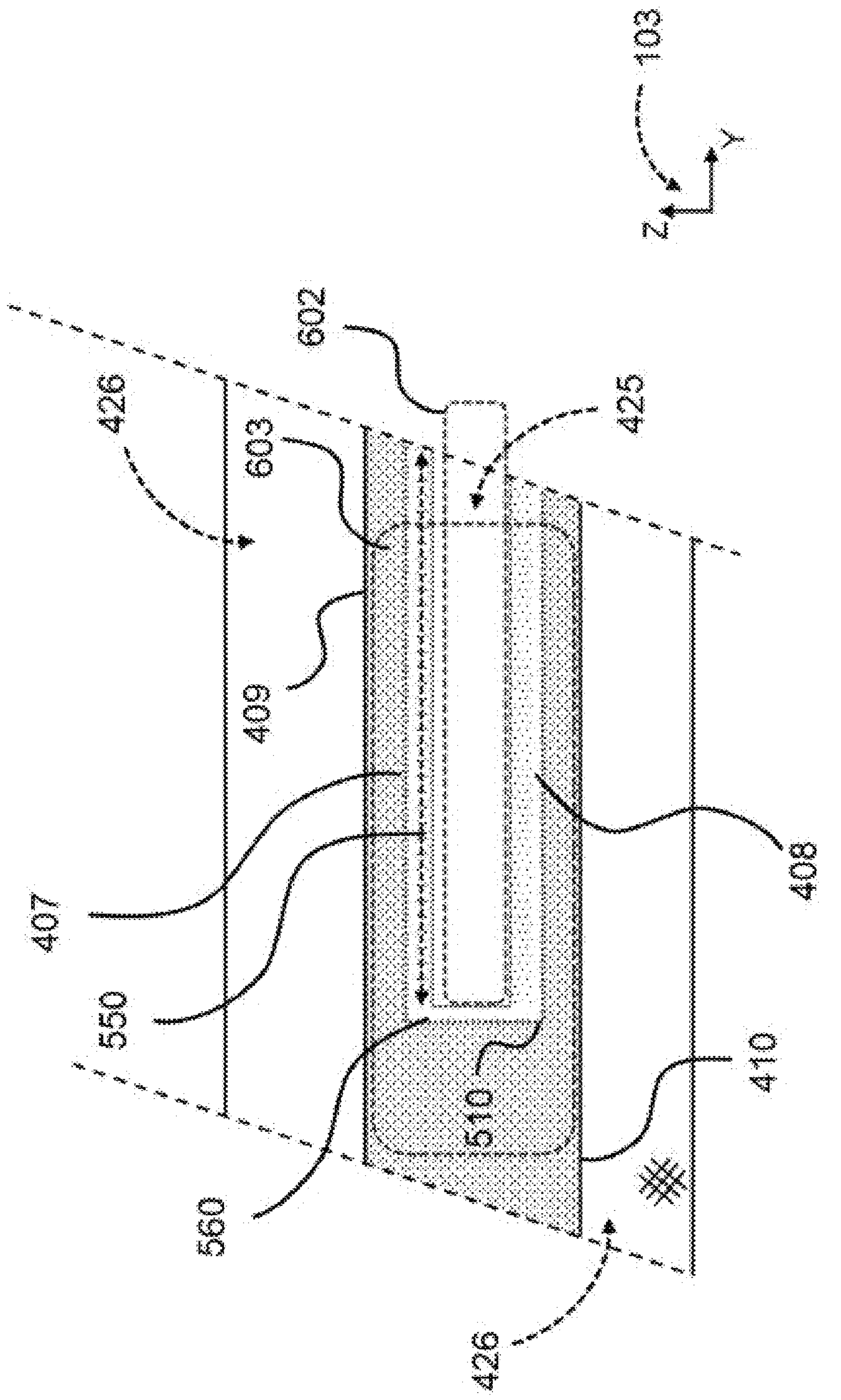
FIG. 3 shows an abstraction of the present invention with a first and a second mating aperture, in accordance with an embodiment.

There is also provided a configuration referred to as DUT 3. The structure of this arrangement is shown in FIG. 3. In the simulated example, the first mating aperture 602 is projected within the second mating aperture 603 by interlacing the conductor edges forming the first mating aperture 602 within the conductor edges forming the second mating aperture 603. The conductor areas in the above example are configured for a width of 1.6 mm. The length of the first mating aperture 602 is 25 mm, and the length of the second mating aperture is 27 mm. Both of the mating apertures comprise a shorted segment 560, and in the above example, the apertures are interlaced such that the interfaces 121 and 122 are arranged at the opposite ends of the device 101. The height of the first mating area 602 is 0.5 mm, and the height of the second mating area is 0.5 mm.

FIG. 3 presents an example of the present invention with a first 602 and a second 603 mating aperture, in accordance with an embodiment.

In an embodiment, the first layered member 405 may comprise a first dielectric layer 425 and at least two conductor edges interfaced with a first 407 or a second 408 surface defined by said first layered member 405, wherein said edges border the first mating aperture 602, and the second layered member 406 may comprise a second dielectric layer 426 and at least two conductor edges interfaced with a third 409 or a fourth 410 surface defined by said second layered member 406, wherein said edges border the second mating aperture 603, wherein said mating apertures 602, 603 are structured to couple through said membrane 510 with a band-pass filtering response for the exchange of the RF signal, wherein the structuring of the conductor areas bordering the mating apertures 602, 603 is arranged to establish a band-pass filtering response for the coupling by forming a transmission window with less than 1 dB coupling loss at a first frequency and a lower transmission notch of at least 3 dB at DC and a higher transmission notch at twice the first frequency by dimensioning of one of said apertures for a half-wave resonance at said higher transmission notch.

In an embodiment, the first layered member 405 may comprise at least two conductor edges that border the first mating aperture 602, and the second layered member 406 comprises at least two conductor edges that border the second mating aperture 603, wherein, at least two of said edges comprise a shorted segment 560 at distance 550 that corresponds a phase shift of less than 180° at the first frequency between said shorted segment 560 and one of said interfaces 121, 122.

In an embodiment, the first microwave element 901 may be a radio unit configured to exchange the RF signal with the second microwave element 902 through the coupling interfaces 121, 122 with a plurality of displacement currents, wherein the at least two conductor edges of the first layered member 405 are arranged to receive the RF signal from the first microwave element 901 at a first frequency, and terminated with an open or closed section for connecting displacement currents that carry the RF signal through said membrane 510 with a coupling loss of less than 1 dB.

In a sixth characteristic according to an embodiment, there is provided a connector arrangement that may be electrically tuned for a specific frequency range by advantageously structuring the conducting elements associated with the mating apertures for forming a bandpass frequency response around a first frequency. In an alternative embodiment, the bandpass frequency response may be configured for multiple passband regions separated by bandstop regions.

In a seventh characteristics of the present invention, there is provided a connector arrangement that may be electrically tuned for a specific frequency range by advantageously loading at least one of the connected microwave elements with lumped components for forming a bandpass frequency response around a first frequency. In an alternative embodiment, the bandpass frequency response may be configured for multiple passband regions separated by bandstop regions.

In an eighth characteristic, the device according to the present invention provides miniaturization means for connecting a first frequency below the structurally configured passband of the mating apertures.

In a ninth characteristic of the present invention, there is provided a device that facilitates cable-free connection between microwave elements. The advantageous characteristic may be used to integrate radio units with flexible antennas without the added complexity of bulky coaxial cables. The advantage of the characteristic is simplification of designs, lowered number of assembly steps, lowered bill of materials, and enhancements in mechanical endurance against breakage.

Furthermore, in wearable applications the invention may provide enhanced "wearability" due to lack of cables, and in exemplary applications such as fabric sails, life vests, and life raft roofs, the characteristic may provide increased reliability over solutions where cable connectors may fail.

Figure 4:
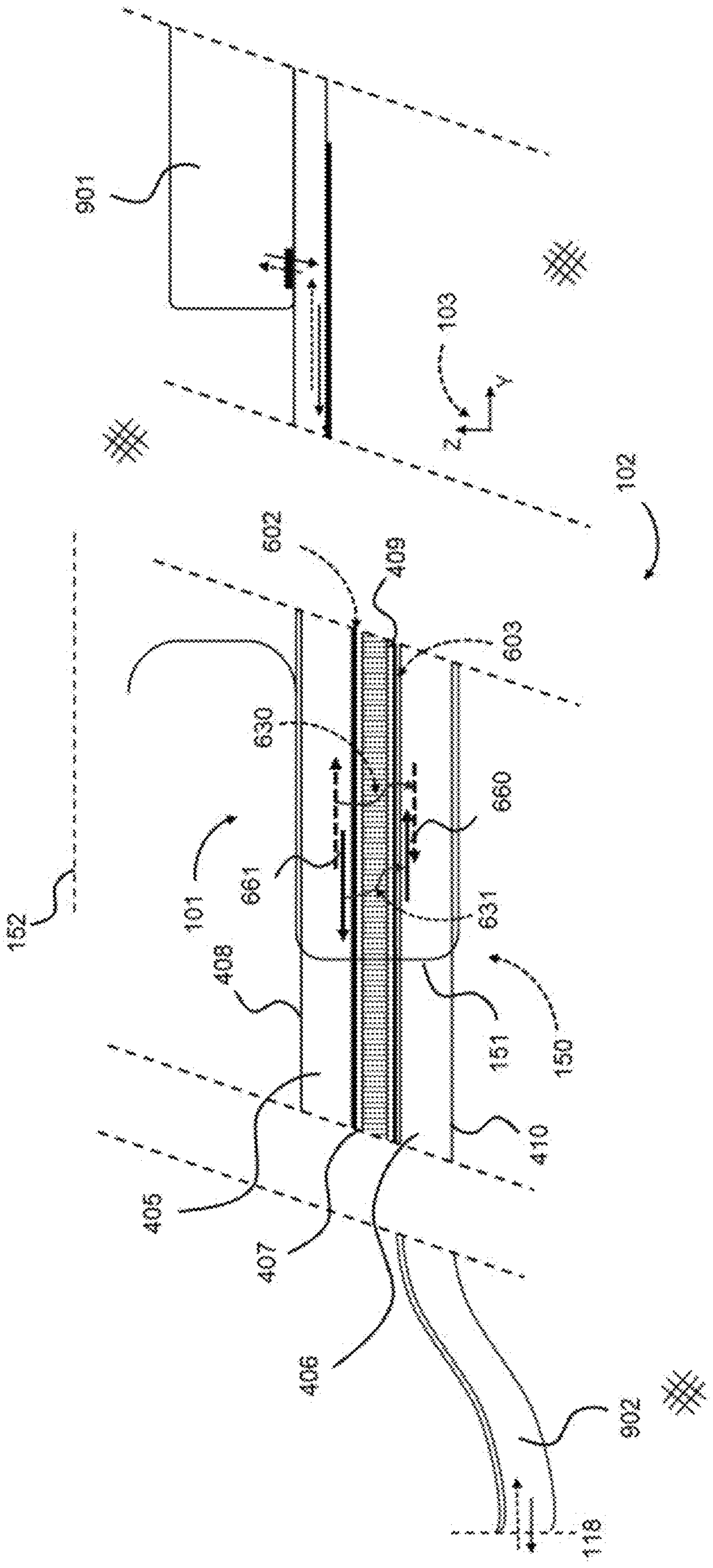
FIG. 4 shows an example of an embodiment with a coupling membrane and coupled current pairs.

FIG. 4 presents an advantageous embodiment of the invention, where a wireless device 102 comprises the device 101 according to the invention to connect a radio unit to an antenna. The first microwave element 901 comprises the radio unit, or it may be connected to the radio unit. There is provided a rigid circuit board, i.e. PCB, to which the radio unit is interfaced, and said PCB may comprise discrete or lumped microwave elements that are configured to match the impedance provided by the device 101 into a specific target impedance. The matching may also be configured to obtain a certain frequency response or bandstop response in an aim to reach the above-mentioned characteristics.

In a tenth characteristic of the present invention, the device may provide enhanced degrees of freedom in radio unit and antenna element integration, as well as structural designs of the antennas or the electronics casing. The device may be configured to be independent of a coaxial termination using the mating apertures on planar layers, films, membranes, or the like, and may therefore allow physical integration that would be otherwise restricted by the traditional RF connectors of cables. As a non-binding example, the film-like interfaces may be mated at the edges or in the middle parts of antenna element surfaces, and the layers may be arranged to be stacked, interlaced, rolled, or folded for mating the microwave elements to be connected. According to the present invention, radio units and casings may be directly integrated with flexible antennas without the use of bulky coaxial cables or soldered RF connectors.

Figure 5:
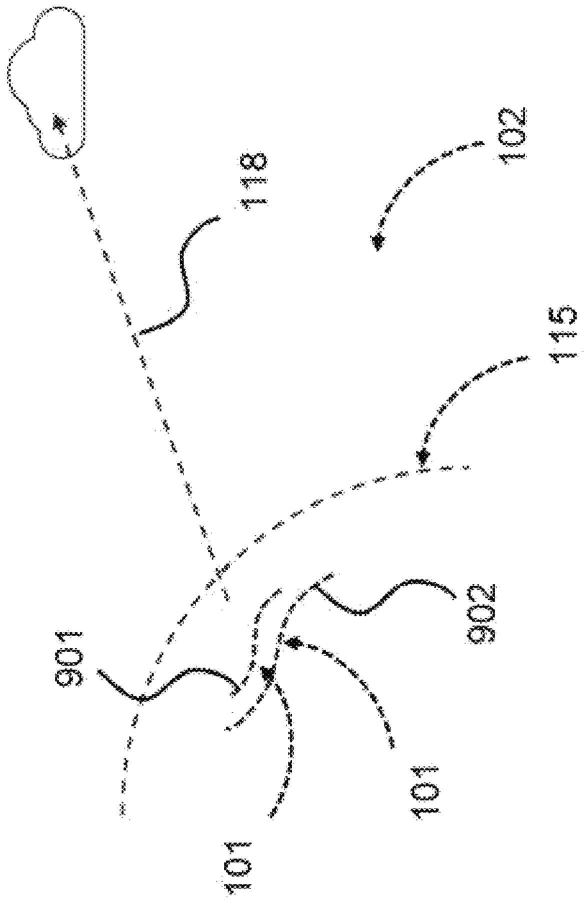
FIG. 5 is a principle view showing the device according to an embodiment of the invention as a part of an integration platform.
Figure 6B:
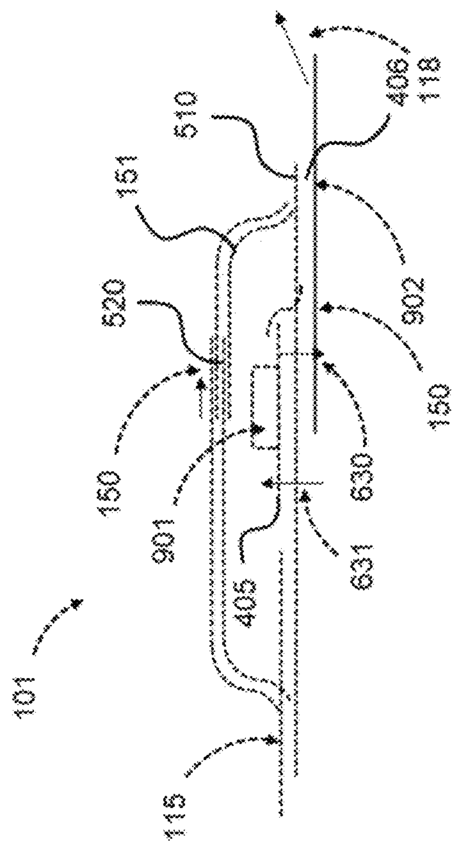
FIGS. 6*a-d* show various configurations of an embodiment.
Figure 6D:
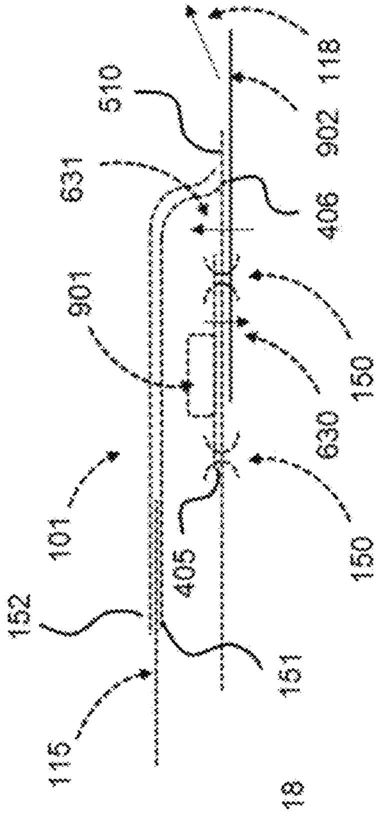
Figure 6A:
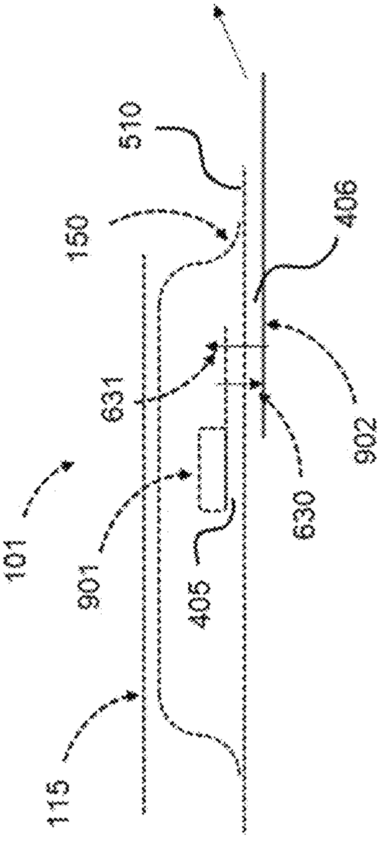
Figure 6C:
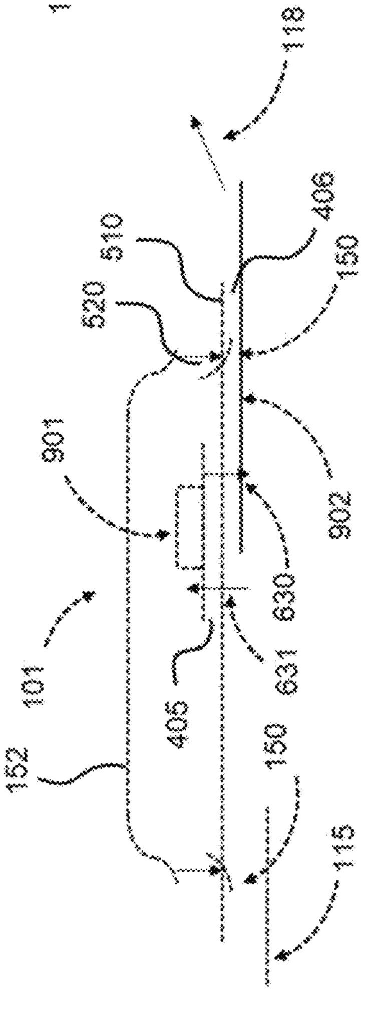

FIG. 5 presents an integration platform 115 for the present invention. Without limiting to the given example, in the figure, there is provided an illustration of a typical use case scenario, where the device is integrated as a part of another layered platform. The wireless connectivity enabled by the present invention, may be used to set up wireless communication links, or equally the RF signal may be used for reception purposes, such as in the case of global navigation systems.

In an embodiment, the integration platform 115 may be a layered device.

In another embodiment, there is provided a layered platform comprising the device 101.

Without limiting the potential scope of the invention, a typical use case might be, e.g. as a part of a textile antenna, smart fabric, or other flexible, conformal, or bendable product.

In an embodiment, there is provided a method for connecting RF signal between the first 901 and a second 902 microwave element, using the device 101 according to the present invention, wherein, connecting the first microwave element 901 wirelessly to an external radio by connecting the RF signal through said membrane 510.

In an embodiment, the textile antenna may be adapted to be connected to a radio unit with the device 101. The textile antenna may comprise a flexible substrate and conductor areas, from which at least one is a textile layer, wherein the connector arrangement 101 is adapted to facilitate a rigid-to-flexible transition for the RF signal through said membrane 510.

While the presented examples describe flexible antennas and flexible platforms, it is to be understood that this does not limit the potential scope of the present invention. Given a flexible antenna as a form of a film, for example, one might consider attaching said film as a part of a rigid platform or a surface. Then, the later attachment might transform the originally flexible membrane into a non-flexible due to the characteristics of the integration platform.

In an embodiment, at least one of the first 405 or second 406 layered members may be at least partially rigidized by configuring the device 101 as a part of a rigid member.

In an embodiment, at least one of the first 405 or second 406 layered members may be at least partially rigidized by configuring a rigid member as a part of the device 101.

In an embodiment, at least one of the first 405 or second 406 layered members may be configured as a structural member of at least partially rigidized body.

In an embodiment, said at least partially rigidized body may comprise a body of a drone, an unmanned aerial vehicle, a helmet, a wearable unit, an airship, a ship or a yacht, a life raft, a vehicle, or a part of a cushioning.

In an embodiment, the integration platform may be a clothing, apparel, or a backpack.

In an embodiment, the integration platform may be a tent.

In an embodiment, the integration platform may be a furniture.

The wireless device 102 may be configured to establish, or to connect to a wireless interface 118. The interface may be advantageously set up to a cloud server, a base station, or to a wireless node.

In an eleventh characteristic of the present invention, the device may be configured to be independent of galvanic contacts between the connected microwave elements that may be electromagnetically connected through the coupling membrane. The advantage of the lack of soldered contacts may remove or reduce the need for environmentally harmful chemicals needed in soldered contacts. Simultaneously, the coupled membranes may provide flexible joints by removal of the rigid soldered areas from the interfaces.

In a twelfth characteristic, the present invention may be configured to enable fast attachment and removal of the connected microwave elements with an advantageous fixturing member that may be configured as a snap-fit connector.

In a thirteenth characteristic, the present invention may be used to integrate a radio unit and its casing or enclosure with the flexible antenna with a cable-less connection by providing a casing for at least one of the connected elements with a fixturing member that is adapted to mate said elements by enclosing said at least one element, and to provide fixturing of the mating interfaces to facilitate the low-loss broadband rf connection.

In a fourteenth characteristic of the invention, the device according to the present invention may be comprised by a washable textile antenna by the provided advantageous embodiments and methods for interfacing the radio unit with the antenna with a removable connector. In a non-binding example, the antenna comprised by one of the connected or connectable microwave elements may be arranged within a waterproof enclosure, pouch, layer, or the like, and a fixturing member according to the invention, may be configured for mating the two microwave elements of which one comprises the antenna and the other comprises the radio unit, in such way, that the elements may be detached in order to wash the antenna with its integration platform and attached after washing. Advantageous embodiments of the present invention are configured to facilitate said detachment and attachment.

FIGS. 6*a*-*d* present various alternatives of the invention. The fixturing member 150 comprises an inner 151 and/or an outer 152 surface. The examples present various alternatives of integrating the device into the integration platform.

Figure 7:
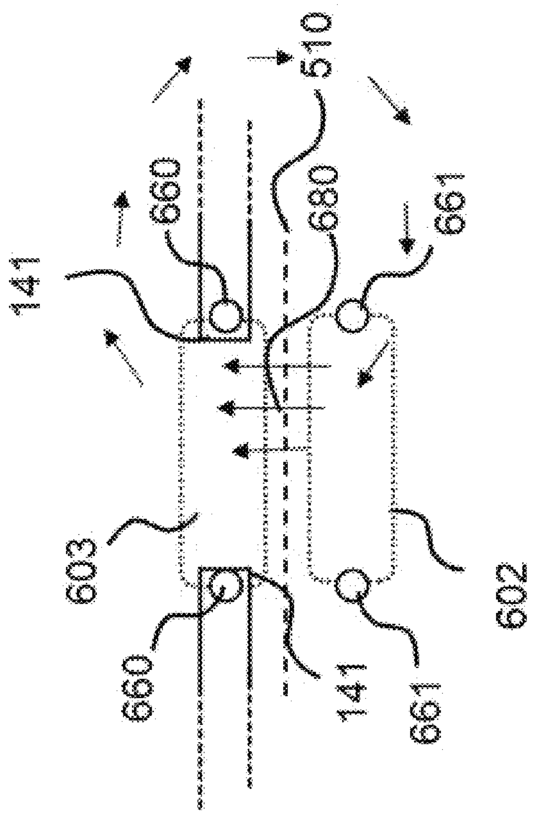
FIG. 7 shows mating apertures with associated current pairs, and a magnetic flux.

FIG. 7 presents the mating apertures 602, 603, and the conductor edges 141 bordering the second mating aperture 603.

The present invention may be advantageously used for wearable antennas, fabric antennas, "smart clothing", or other textile based wireless devices or components. The benefits are not limited to these textile examples, and the connector arrangement of the present invention may be advantageously configured for various devices that connect flexible microwave elements in a form of films, flexes, membranes, or laminates with counterparts for forming the connection of the RF signal according to the present invention.

One or both of the connectable microwave elements may be at least partially rigidized. The use of the device according to the present invention is not exclusively limited to wearable textile antennas.

In a fifteenth characteristic of the invention, there may be provided a waterproof coupling layer for electromagnetically coupling the mating apertures through said layer such that a removable connector arrangement may be configured to connect the RF signal.

In the presented advantageous characteristics of the present invention, the possibility of complete removal of coaxial cables does not restrict the use of the present invention as a part of devices comprising cables, flexes, or ridid-flex-PCB circuits. The invention may be advantageously combined with any of such structures for reaching some of the described benefits.

In an advantageous embodiment, the magnetic flux 680 generated by the first mating aperture 602 is mated with the second mating aperture 603.

In an embodiment, an inner 151 or outer 152 surface of the fixturing member 150 may be configured as a channel 520 for fixturing the surfaces of both of the layered members 405, 406 on the other, wherein the structuring of at least one of the layered members 405, 406 is configured to retain said layer with the surface of said fixturing member 150, wherein the structuring of at least one of the layered members 405, 406 comprises a fold, groove, notch, lip, flange, bevel, ridge, chamfer, tab, or a part, that is configured to interlock the mating apertures 602, 603 upon fixturing the surfaces of the layered members 405, 406 on the other.

In an embodiment, the fixturing member 150 is structured to mate the mating apertures 602, 603 by aligning at least one of the two conductor edges of the first layered member 405 that define the first mating aperture 602 within the projection of the second mating aperture 603 on the second layered member 406, wherein the mating is configured to induce a current pair 660 that coil the second mating aperture 603 by the effect of driving the edges of the first mating aperture 602 with a driving current pair 661 to ignite a magnetic flux 680 to couple said mating apertures 602, 603 to facilitate the electromagnetic coupling between said apertures 602, 603 with less than 1 dB coupling loss at the first frequency.

In an embodiment, the second microwave element 902 may be an antenna configured to exchange the RF signal with the first microwave element 902 through the coupling interfaces 121, 122, wherein the at least two conductor edges of the second layered member 406 are arranged to receive a plurality of displacement currents connecting the RF signal from the first microwave element 901 at a first frequency through said membrane 510, and terminated with an open or closed section for receiving the RF signal with a coupling loss of less than 1 dB.

In an embodiment, the first microwave element 901 may be a radio unit configured to exchange RF signals with the second microwave element 902 through the coupling interfaces 121, 122, wherein the fixturing member 150 is configured to at least partially enclose the radio unit, and the second microwave element 902 is an antenna configured to exchange RF signals with the first microwave element 901 through the coupling interfaces 121, 122, wherein the fixturing member 150 is configured to at least partially enclose the antenna.

In an embodiment, there is provided a device 101 for connecting an RF signal between a first 901 and a second 902 microwave element, comprising coupling interfaces 121, 122, wherein said device 101 is arranged to facilitate the connection with less than 2 dB coupling loss between said interfaces 121, 122, wherein the first microwave element 901 comprises a radio unit on a rigid PCB, and wherein the second microwave element 902 comprises a flexible antenna. The device 101 may comprise the first layered member 405 that is a part of, or in connection with said PCB, and the second layered member 406 is arranged to be connected with the flexible antenna.

In the figures, the corresponding coordinate system 103 may be presented.

In the following some examples of the embodiments according to the present invention will be provided.

In accordance with a first example, there is provided a device 101 for connecting RF signal between a first 901 and a second 902 microwave element, the device 101 comprising coupling interfaces 121, 122, wherein the device 101 is arranged to facilitate said connection with less than 2 dB coupling loss between said interfaces 121, 122 at a first frequency. The device is a connector arrangement 101 that comprises a first 405 and a second 406 layered member structured to be mated with a fixturing member 150 of the device 101, and said members 405, 406 being isolated by a coupling membrane 510, wherein the first layered member 405 comprises a first mating aperture 602, arranged to receive the RF signal from the first microwave element 901 via first of the coupling interfaces 121, and the second layered member 406 comprises a second mating aperture 603, arranged to connect the received RF signal to the second microwave element 902 via second of the coupling interfaces 122.

In accordance with a second example, the first layered member 405 comprises a first dielectric layer 425 and at least two conductor edges interfaced with a first 407 or a second 408 surface defined by said first layered member 405, wherein said edges border the first mating aperture 602, and the second layered member 406 comprises a second dielectric layer 426 and at least two conductor edges interfaced with a third 409 or a fourth 410 surface defined by said second layered member 406, wherein said edges border the second mating aperture 603, wherein said mating apertures 602, 603 are structured to couple through said membrane 510 with a band-pass filtering response for the exchange of the RF signal.

In accordance with a third example, the first layered member 405 comprises at least two conductor edges that border the first mating aperture 602 with conductor areas, wherein the at least two conductor edges of the first layered member 405 are arranged to receive the RF signal from the first microwave element 901 at a first frequency under mating, and the second layered member 406 comprises at least two conductor edges that border the second mating aperture 603 with conductor areas, wherein, the structuring of the conductor areas bordering said mating apertures 602, 603 is configured such that upon receiving said RF signal, the induced electric field strength between one of the two mated conductor area pairs bordering the opposite mating apertures 602, 603 exceeds the electric field strength of the weaker of the electric field strengths within the two mating apertures 602, 603 at the first frequency.

In accordance with a fourth example, the first layered member 405 comprises at least two conductor edges that border the first mating aperture 602 with conductor areas, wherein the at least two conductor edges of the first layered member 405 are arranged to receive the RF signal from the first microwave element 901 at a first frequency under mating, and the second layered member 406 comprises at least two conductor edges that border the second mating aperture 603 with conductor areas, wherein, the structuring of the conductor areas bordering said mating apertures 602, 603 is configured such that the interlaced or overlapped surface area between one of the two mated conductor area pairs bordering the opposite mating apertures 602, 603 exceeds the interlaced or overlapped surface area shared by the mated mating apertures 602, 603.

In accordance with a fifth example, the structuring of the conductor areas bordering said mating apertures 602, 603 is arranged to connect a first 630 and a second 631 displacement current path through said membrane 510 to facilitate the coupling with less than 1 dB coupling loss through said membrane 510 upon reception of the RF signal by the first mating aperture 602 by coupling a first and a second conduction current from the edges of said first mating aperture 602 to the edges of said second mating aperture 603 with both conduction currents changing direction.

In accordance with a sixth example, the structuring of the conductor areas bordering the mating apertures 602, 603 is arranged to establish a band-pass filtering response for the coupling by forming a transmission window with less than 1 dB coupling loss at a first frequency and a lower transmission notch of at least 3 dB at DC and a higher transmission notch at twice the first frequency by dimensioning of one of said apertures for a half-wave resonance at said higher transmission notch.

In accordance with a seventh example, the inner 151 or outer 152 surface of the fixturing member 150 is configured as a channel 520 for fixturing the surfaces of both of the layered members 405, 406 on the other, wherein the structuring of at least one of the layered members 405, 406 is configured to retain said layer with the surface of said fixturing member 150.

In accordance with an eighth example, the structuring of at least one of the layered members 405, 406 comprises a fold, groove, notch, lip, flange, bevel, ridge, chamfer, tab, or a part, that is configured to interlock the mating apertures 602, 603 upon fixturing the surfaces of the layered members 405, 406 on the other.

In accordance with a ninth example, the first microwave element 901 is a radio unit configured to exchange the RF signal with the second microwave element 902 through the coupling interfaces 121, 122 with a plurality of displacement currents, wherein the at least two conductor edges of the first layered member 405 are arranged to receive the RF signal from the first microwave element 901 at a first frequency, and terminated with an open or closed section for connecting displacement currents that carry the RF signal through said membrane 510 with a coupling loss of less than 1 dB.

In accordance with a tenth example, the second microwave element 902 is an antenna configured to exchange the RF signal with the first microwave element 902 through the coupling interfaces 121, 122, wherein the at least two conductor edges of the second layered member 406 are arranged to receive a plurality of displacement currents connecting the RF signal from the first microwave element 901 at a first frequency through said membrane 510, and terminated with an open or closed section for receiving the RF signal with a coupling loss of less than 1 dB.

In accordance with an eleventh example, the first microwave element 901 is a radio unit configured to exchange RF signals with the second microwave element 902 through the coupling interfaces 121, 122, wherein the fixturing member 150 is configured to at least partially enclose the radio unit.

In accordance with a twelfth example, the second microwave element 902 is an antenna configured to exchange RF signals with the first microwave element 901 through the coupling interfaces 121, 122, wherein the fixturing member 150 is configured to at least partially enclose the antenna.

In accordance with a thirteenth example, there is provided the device 101 for connecting an RF signal between a first 901 and a second 902 microwave element, comprising coupling interfaces 121, 122, wherein said device 101 is arranged to facilitate the connection with less than 2 dB coupling loss between said interfaces 121, 122, wherein the first microwave element 901 comprises a radio unit on a rigid PCB, and wherein the second microwave element 902 comprises a flexible antenna. The device 101 comprises the first layered member 405 that is a part of, or in connection with said PCB, and the second layered member 406 is arranged to be connected with the flexible antenna.

In accordance with a fourteenth example, the flexible antenna comprises flexible substrate and conductor layers, from which at least one is a textile layer, wherein the connector arrangement 101 is adapted to facilitate a rigid-to-flexible transition for the RF signal through said membrane 510.

In accordance with a fifteenth example, there is provided a textile antenna adapted to be connected to a radio unit with a connector arrangement 101 according to the present invention.

In accordance with a sixteenth example, there is provided a layered platform comprising the device 101 according to the present invention.

In accordance with a seventeenth example, there is provided a method for connecting RF signal between a first 901 and a second 902 microwave element, using the device 101 according to the present invention, comprising a step of connecting the first microwave element 901 wirelessly to an external radio by connecting the RF signal through said membrane 510.

In accordance with an eighteenth example, there is provided a fixturing member 150 of a connector arrangement 101, wherein said fixturing member 150 is structured for mating a first 901 and a second 902 microwave element of a wireless device 102, wherein one of said elements 901, 902 is adapted to be coupled to a radio unit capable of transmitting or receiving an RF signal of a first frequency, and the other of said elements 901, 902 is adapted to be coupled to an antenna capable of receiving or transmitting the RF signal of the first frequency, wherein, the connector arrangement 101 is configured to facilitate a cable-less connection for the RF signal between a rigid circuit board comprising the radio unit and a flexible layer comprising the antenna, wherein the connector arrangement 101 comprises a first layered member 405 defining a first 407 and a second 408 surface, and a second layered member 406 defining a third 409 and a fourth 410 surface. Said fixturing member 150 comprises an inner 151 and an outer 152 surface, and is structured to mate a first mating aperture 602 of the first microwave element 901 to a second mating aperture 603 of the second microwave element 902 to facilitate electromagnetic coupling between said apertures 602, 603 with less than 1 dB coupling loss at the first frequency by: the mating the first surface 407 with said third surface 409, and by the projection of the first mating aperture 602 of a first layered member 405 within the projection of the second mating aperture 603 of a second layered member 406 by the interlock provided by said inner 151 or outer 152 surface.

In accordance with a nineteen example, said fixturing member 150 is structured to mate the mating apertures 602, 603 by aligning at least one of the two conductor edges of the first layered member 405 that define the first mating aperture 602 within the projection of the second mating aperture 603 on the second layered member 406, wherein the mating is configured to induce a current pair 660 that coil the second mating aperture 603 by the effect of driving the edges of the first mating aperture 602 with a driving current pair 661 to ignite a magnetic flux 680 to couple said mating apertures 602, 603 to facilitate the electromagnetic coupling between said apertures 602, 603 with less than 1 dB coupling loss at the first frequency.

In accordance with a twentieth example, said mating apertures 602, 603 are dimensioned such that the apertures have an elongated shape, which may be straight, bent, grooved, or folded, and from which at least one is configured to have an open or shorted termination.

In accordance with a twenty-first example, said termination is configured to establish a filtering response for the coupling by forming a transmission window with less than 1 dB coupling loss at the first frequency and a transmission notch of at least 3 dB at the frequency that corresponds to a half of a wavelength at the guided wavelength associated with said terminated aperture.

In accordance with a twenty-second example, said connector arrangement 101 is configured to establish the filtering response with at least 3 dB transmission notch at DC by an arrangement where the coupling is foamed through a coupling membrane 510.

In accordance with a twenty-third example, said fixturing member 150 is structured to mate the mating apertures 602, 603 by at least partially enclosing of one of said elements 901, 902 by the fixturing member 150 and interfacing said inner surface 151 with at least one of said second 408 or fourth 410 surface.

In accordance with a twenty-fourth example, there is provided the fixturing member 150, wherein the fixturing member 150 comprises one or multiple plastic members structured to interlock the first microwave element 901 to said apertures 602, 603, wherein said fixturing member 150 comprises an inner surface 151. The inner surface 151 is structured to mate said apertures by the compression provided by the inner surface 151 on said second 408 and fourth 410 surface.

In accordance with a twenty-fifth example, the fixturing member 150 comprises a snap-fit mechanism that is structured to facilitate said interlock to facilitate said coupling.

In accordance with a twenty-seventh example, the connector arrangement 101 is configured to at least partially enclose the antenna or the radio unit.

In accordance with a twenty-fourth example, the connector arrangement 101 comprises a snap-fit connector adapted to facilitate said coupling.

In accordance with a twenty-fifth example, the fixturing member 150 is a snap-fit connector adapted to facilitate said interlock.

In accordance with a twenty-sixth example, there is provided a wireless device 102 comprising the fixturing member 150 according to the present invention. The fixturing member 150 is configured to connect the RF signal between the wireless device 102 and a wireless interface.

In accordance with a twenty-seventh example, there is provided the wireless device 102, wherein the RF signal carries a modulated package according to IMT-2020 or IMT-2030 protocol or a GNSS signal modulated using CDMA or BPSK techniques.

In accordance with a twenty-eighth example, there is provided an integration platform 115 comprising the fixturing member 150, wherein the integration platform comprises a wearable or body-worn member, a fabric, a kite, a sail, a tent, a sleeping bag, a backpack, a surface of an airborne unit such as drone or unmanned aerial vehicle UAV, surface of an airship or a marine platform such as yacht, ship, life vest, or life raft.

In accordance with a twenty-eighth example, there is provided a method for connecting RF signal between a rigid circuit board comprising a radio unit and a flexible layer comprising an antenna using a mated projection of a first mating aperture 602 of a first layered member 405 within the projection of the second mating aperture 603 of a second layered member by using the interlock provided by the fixturing member 150 according to the present invention.

In accordance with a twenty-ninth example, there is provided the device 101 for connecting RF signal between a first 901 and a second 902 microwave element, the device 101 comprising coupling interfaces 121, 122, wherein the device 101 is arranged to facilitate said connection with less than 2 dB coupling loss between said interfaces 121, 122 at a first frequency. The device is a connector arrangement 101 that comprises a first 405 and a second 406 layered member structured to be mated with a fixturing member 150 of the device 101, and said members 405, 406 being isolated by a coupling membrane 510, wherein the first layered member 405 comprises a first mating aperture 602, arranged to receive the RF signal from the first microwave element 901 via first of the coupling interfaces 121, and the second layered member 406 comprises a second mating aperture 603, arranged to connect the received RF signal to the second microwave element 902 via second of the coupling interfaces 122, wherein said fixturing member 150 is structured for mating the mating apertures 602, 603 to exchange the RF signal through said membrane 510 to facilitate said connection as a result of projecting one of said apertures on the other by fixturing a surface of both layered members 405, 406 on the other.

In accordance with a twenty-ninth example, there is provided the device 101 for connecting RF signal between a first 901 and a second 902 microwave element, the device 101 comprising coupling interfaces 121, 122, wherein the device 101 is arranged to facilitate said connection with less than 2 dB coupling loss between said interfaces 121, 122 at a first frequency. The device is a connector arrangement 101 that comprises a first 405 and a second 406 layered member structured to be mated with a fixturing member 150 of the device 101, and said members 405, 406 being isolated by a coupling membrane 510, wherein the first layered member 405 comprises a first mating aperture 602, arranged to receive the RF signal from the first microwave element 901 via first of the coupling interfaces 121, and the second layered member 406 comprises a second mating aperture 603, arranged to connect the received RF signal to the second microwave element 902 via second of the coupling interfaces 122, wherein the first mating aperture 602 is arranged to mate with the second mating aperture 602 by looping the magnetic flux 680 generated by said first aperture 602 through said membrane 510 and via the second aperture 603 upon receiving the RF signal by the first aperture 602.

In accordance with a thirtieth example, the first layered member 405 comprises at least two conductor edges that border the first mating aperture 602, and the second layered member 406 comprises at least two conductor edges that border the second mating aperture 603, wherein at least two of said edges are shorted together at distance that corresponds a phase shift of less than 180° at the first frequency between said short and one of said interfaces 121, 122.

In accordance with a thirty-first example, the fixturing member 150 may comprise a magnet that is arranged to facilitate the mating of the surfaces of the first and the second layered member.

The present invention is not limited solely to the above-presented embodiments, but it can be modified within the scope of the appended claims.

The invention claimed is:

1. A device for connecting RF signal between a first and a second microwave element, the device comprising coupling interfaces, wherein the device is arranged to facilitate said connection with less than 2 dB coupling loss between said interfaces at a first frequency, wherein the device is a connector arrangement that comprises a first and a second layered member structured to be mated with a fixturing member of the device, and said first and second layered member being isolated by a coupling membrane of the device, wherein the first layered member comprises a first mating aperture, arranged to receive the RF signal from the first microwave element via first of the coupling interfaces, and the second layered member comprises a second mating aperture, arranged to connect the received RF signal to the second microwave element via second of the coupling interfaces, and the first layered member comprises at least two conductor edges that border the first mating aperture with conductor areas, wherein the at least two conductor edges of the first layered member are arranged to receive the RF signal from the first microwave element at a first frequency under mating, and the second layered member comprises at least two conductor edges that border the second mating aperture with conductor areas, wherein, the structuring of the conductor areas bordering said mating apertures is configured such that the interlaced or overlapped surface area between one of the two mated conductor area pairs bordering the opposite mating apertures exceeds the interlaced or overlapped surface area shared by the mated mating apertures.

2. The device according to claim 1, wherein said fixturing member is structured for mating the mating apertures to exchange the RF signal through said membrane to facilitate said connection as a result of projecting one of said apertures on the other by fixturing a surface of both layered members on the other.

3. The device according to claim 1, wherein the first layered member comprises a first dielectric layer and at least two conductor edges interfaced with a first or a second surface defined by said first layered member, wherein said edges border the first mating aperture, and the second layered member comprises a second dielectric layer and at least two conductor edges interfaced with a third or a fourth surface defined by said second layered member, wherein said edges border the second mating aperture, wherein said mating apertures are structured to couple through said membrane with a band-pass filtering response for the exchange of the RF signal, wherein the structuring of the conductor areas bordering said mating apertures is arranged to establish a band-pass filtering response for the coupling by forming a transmission window with less than 1 dB coupling loss at a first frequency and a lower transmission notch of at least 3 dB at DC and a higher transmission notch at twice the first frequency by dimensioning of one of said apertures for a half-wave resonance at said higher transmission notch.

4. The device according to claim 1, wherein the first layered member comprises at least two conductor edges that border the first mating aperture with conductor areas, wherein the at least two conductor edges of the first layered member are arranged to receive the RF signal from the first microwave element at a first frequency under mating, and the second layered member comprises at least two conductor edges that border the second mating aperture with conductor areas, wherein, the structuring of the conductor areas bordering said mating apertures is configured such that upon receiving said RF signal, the induced electric field strength between one of the two mated conductor area pairs bordering the opposite mating apertures exceeds the electric field strength of the weaker of the electric field strengths within the two mating apertures at the first frequency.

5. The device according to claim 1, wherein an inner or outer surface of the fixturing member is configured as a channel for fixturing the surfaces of both of the layered members on the other, wherein the structuring of at least one of the layered members is configured to retain said layer with the surface of said fixturing member, wherein the structuring of at least one of the layered members comprises a fold, groove, notch, lip, flange, bevel, ridge, chamfer, tab, or a part, that is configured to interlock the mating apertures upon fixturing the surfaces of the layered members on the other.

6. The device according to claim 1, wherein the first layered member comprises at least two conductor edges that border the first mating aperture, and the second layered member comprises at least two conductor edges that border the second mating aperture, wherein, at least two of said edges comprise a shorted segment at distance that corresponds a phase shift of less than 180° at the first frequency between said shorted segment and one of said interfaces.

7. A textile antenna adapted to be connected to a radio unit with the device according to claim 1, wherein the textile antenna comprises a flexible substrate and conductor areas, from which at least one is a textile layer, wherein the connector arrangement is adapted to facilitate a rigid-to-flexible transition for the RF signal through said membrane.

8. A method for connecting RF signal between a first and a second microwave element, using the device according to claim 1, the method comprising connecting the first microwave element wirelessly to an external radio by connecting the RF signal through said membrane.

* * * * *